Dec. 9, 1941.  J. R. BEERS ET AL  2,265,414
GLASS FEEDER CONTROL APPARATUS
Filed Oct. 22, 1938  2 Sheets-Sheet 1

INVENTOR.
John R. Beers
William J. Beers
BY William B. Jaspert
ATTORNEY.

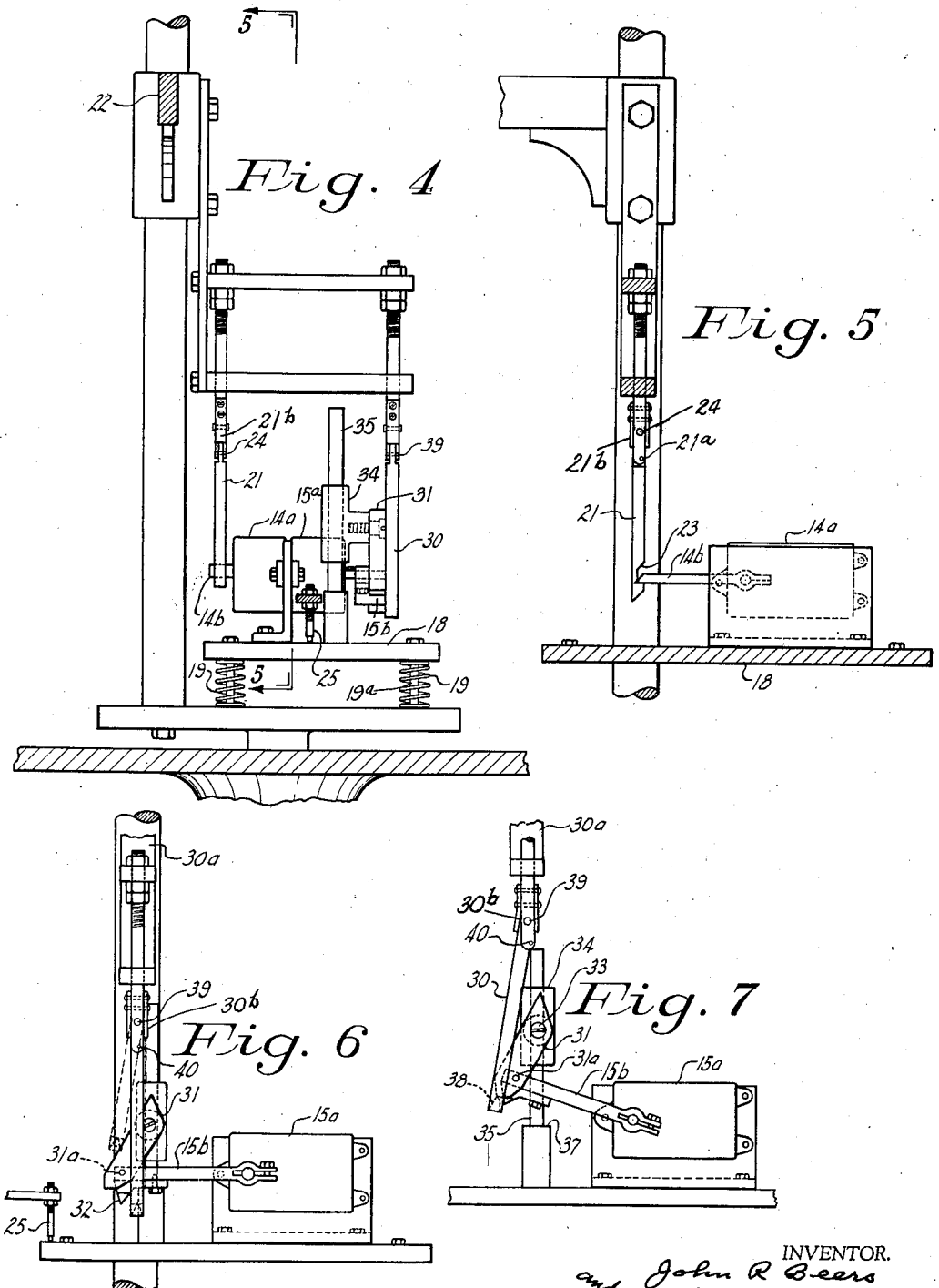

Patented Dec. 9, 1941

2,265,414

UNITED STATES PATENT OFFICE 2,265,414

GLASS FEEDER CONTROL APPARATUS

John R. Beers and William F. Beers, Jeannette, Pa., assignors to McKee Glass Company, Jeannette, Pa., a corporation of Pennsylvania Application October 22, 1938, Serial No. 236,458

3 Claims. (Cl. 49—5)

This invention relates to new and useful improvements in apparatus for controlling the size or weight of mold charges of molten glass fed to the molds of ware forming machines for making tumblers or the like, and it is among the objects thereof to provide means for regulating the glass feeding apparatus to automatically control the size or weight of the mold charges delivered thereby, and to maintain the size or weight of such charges substantially uniform, and this application is a continuation in part of an application serially numbered 155,420 filed July 24, 1937.

The present invention is particularly designed to provide means for regulating the glass feeding apparatus to control the size or weight of the mold charges regardless of variations in the height of the molds. It is, therefore, a primary object of the invention to provide a mechanism responsive to variations in the mold charges fed to the mold which shall be operative to accurately indicate the need for adjustment of the feeding mechanism irrespective of variations in mold sizes or influences other than the volumetric changes of the glass.

A further object of the invention is the provision of manual or automatic control means so sensitive as to produce quick and minute responses of the glass feeding mechanism.

These and other objects of the invention will become more apparent from a consideration of the accompanying drawings constituting a part hereof in which like reference characters designate like parts and in which.

Figure 1:
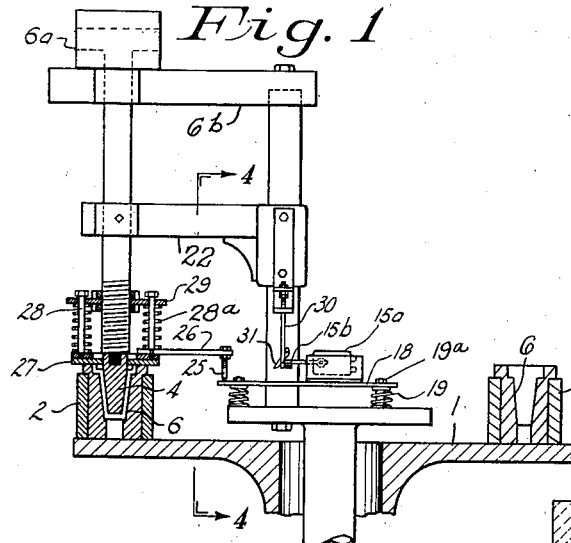
Fig. 1 is a front elevational view partially in section of a ware forming machine for making glass tumblers embodying the means for indicating variations in mold charges.
Figure 3:
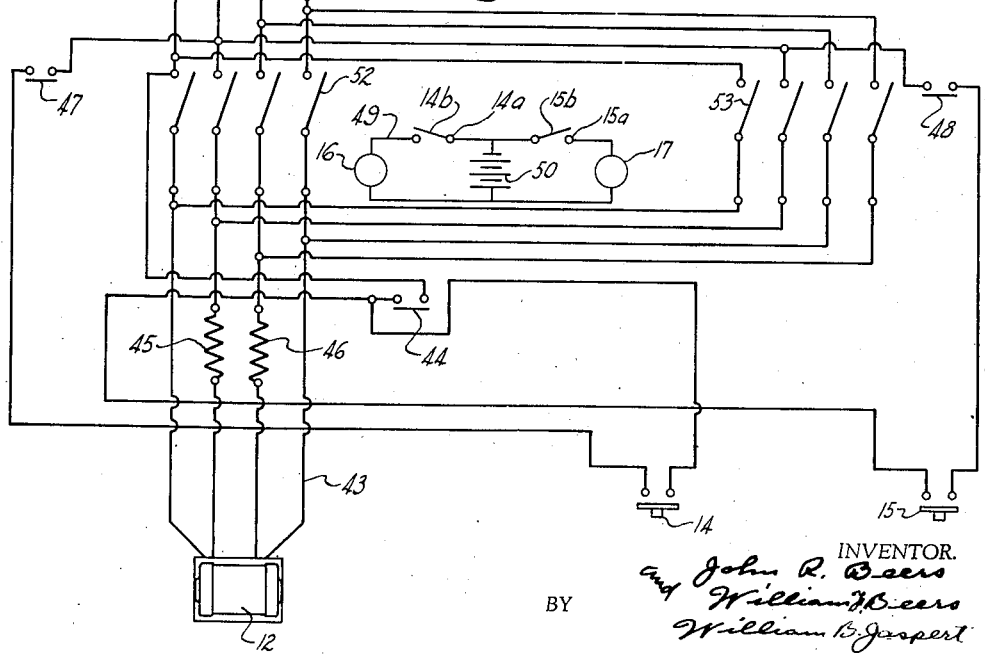

Fig. 3 a wiring diagram of the signal and motor circuit for controlling the feed adjusting mechanism;

Fig. 4 a side elevational view of a portion of the ware forming machine and control switch actuated thereby taken along the line 4—4, Fig. 1;

Fig. 5 a front elevational view thereof; and

Figs. 6 and 7 side elevational views of a portion of the forming machine frame and control switches.

Figure 2:
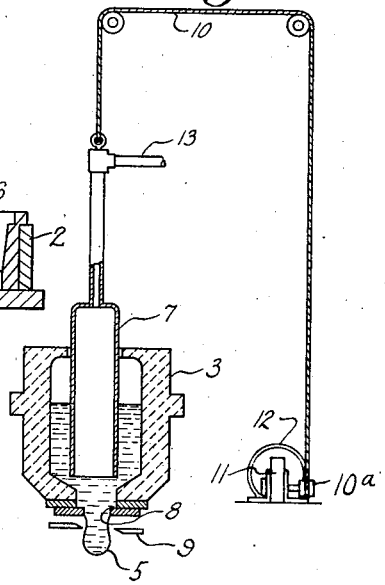
Fig. 2 is a vertical cross-sectional view of a feeder boot of glass feeding apparatus for delivering mold charges to the forming machine of Fig. 1.

With reference to Fig. 1 of the drawings, the structure therein illustrated comprises a table 1 having a plurality of angularly spaced molds 2 mounted thereon, the table being subjected to rotary movement to bring the molds 2 in successive alignment with a feeding device generally designated by the numeral 3, as shown in Fig. 2, and a forming plunger designated by the reference character 4, the molds receiving a charge in the form of a gob 5 which is pressed to the shape of the contour of the mold, as represented by the matrix portion 6 by displacement of the glass when the plunger 4 is pressed therein, the shape of the matrices of the mold and plunger shown in Fig. 1 being for forming a tumbler.

The plunger 4 is actuated by a piston in cylinder 6a by which it is subjected to vertical movement in timed relation with the index and dwell periods of the table 1 to which the feeding apparatus 3 is likewise adjusted. These movements are controlled in the conventional manner by an air timer mechanism, not shown. Cylinder 6a is supported on the forming machine frame generally designated by the numeral 6b and is a piston cylinder of the type commonly used in the glass fabricating art for actuating forming plungers.

If for any reason the volume of the glass fed to the mold varies due to change in the viscosity or temperature of the glass in the forehearth of the glass melting tank, the weight of the ware will likewise vary, and in accordance with the present invention provision is made to indicate such changes so that timely adjustment may be made. As shown in Fig. 2, one form of glass feeder control comprises a hollow sleeve 7 which is adjustable vertically relative to a feeding orifice 8 whereby to vary the size of the mold charge 5 which is severed by cutting shears 9. For illustration, the adjustable sleeve 7 is suspended by a flexible cable 10 mounted on a drum 10a that is operated through a transmission 11 actuated by a motor 12. The motor is of the reversing type and may be energized by suitable switches as will be hereinafter described to raise or lower the sleeve 7, thereby increasing or decreasing the volume of the mold charge 5 as required. The conduit 13 supplies positive and negative air pressures to expel or retard the glass movement through the orifice, or negative pressure alone may be used for retarding the glass at the time of severance when the mold charge 5 is placed in the mold 2.

As shown in the diagram of Fig. 3, the motor 12 is connected in a power line controlled by a pair of push button switches 14 and 15, one of which energizes the motor in one direction of rotation and the other in the opposite direction of rotation. Either audible or light signals or both are employed to indicate change in the glass feeding device, and a pair of lights 16 and 17 are shown for this purpose. Referring to Figs. 4 and 5, a signal switch 14a is mounted on a platform 18 supported on springs 19 the platform being vertically movable on guide bolts 19a. The switch arm 14b is actuated by a notched finger 21 which is mounted on a yoke 22 attached to the plunger 4 mounted to be movable with the plunger 4. The finger 21 is yieldingly held against displacement by leaf springs 21b. The end of switch arm 14b is chamfered as is the notch 23 in the finger 21, the latter being pivotally mounted at 24 to be displaceable if it meets with an obstruction and to permit it to slide along the chamfered face of the switch arm 14b in its downward movement without moving the switch arm. If, however, the downward travel of plunger 4 is in excess of the normal for the amount of glass to be fed, finger 21 will travel downward a sufficient distance to engage the switch arm 14b and pull it upward to close signal switch 14a.

To compensate for variations in the height of the molds 2, provision is made to displace the switch 14a by means of an adjustable screw 25 carried by an arm 26 that is attached to the spring plate 27 of the plunger head. The spring plate 27 engages the top of the mold before the plunger has completed its displacement stroke in a downward direction. The spring plate 27 is suspended by bolts 28 from a plate 29 attached to the plunger 4 and coil springs 28a disposed around bolts 28 hold plate 27 in spaced relation with plate 29. As the plunger carrying the spring plate moves downward the plate will rest on top of the mold permitting continuous downward movement of the plunger 4 into the mold. If the mold is lower than other molds on the table, the adjustable screw 25 will engage the switch support 18 and displace it downwardly to compensate for the difference in the mold height. Consequently, the signal circuit will not become energized unless there is an actual change in the volume of glass in the mold, beyond the variation in mold height, so that the movable switch finger 21 travels downwardly a sufficient distance to engage the switch arm 14b and actuate the switch. By setting the apparatus originally to the highest mold of the mold group on the table, accurate compensation is made for shorter molds by the downward displacement of the spring support 18 through contact of the adjustable screw 25.

In Figs. 1, 6 and 7 is shown the switch 15a which energizes the circuit to indicate that an excess amount of glass is being fed to the molds. This switch is actuated by a switch arm 15b, a finger 30, a cam 31 for the switch finger 30, and a cam follower 32 bolted to the switch arm 15b. The finger 30 is yieldingly mounted against displacement by leaf springs 30b. The cam 31 is pivotally mounted by a shoulder screw 33 to a cam slide 34 which is disposed on a square slide rail 35 which is mounted on the spring base 18 and cam 31 is further pivotally connected to switch arm 15b at 31a. The square slide rail 35 is provided with a shoulder 37 that constitutes a stop for the vertically moving cam slide 34.

Finger 30 is provided with an extension lug 38 which engages the follower 32 under conditions hereinafter stated. Finger 30 is pivoted to the vertical support 30a by a hinge pin 39 and support 30a is provided with a pin 40 when it is desired to throw the trigger out of operation as shown in dotted lines, Fig. 6.

Referring to Fig. 3 of the drawings, the wiring diagram shows the connection of push-button switches 14 and 15 in the motor circuit, these switches being starter switches. The numeral 42 designates the power circuit, 43 the circuit of motor 12. Numeral 44 designates an overload relay thermally controlled by heater coils 45 and 46. Relay 44 opens the motor circuit if for any reason the motor is overloaded. The numerals 47 and 48 designate auxiliary contacts.

The auxiliary contacts 47 and 48 prevent the simultaneous closing of both push-button switches 14 and 15. When one switch is opened, the auxiliary contact of the other switch feeds current to hold in coil of the closed switch and vice versa. Switches 51, 52 and 53 are magnetic switches which start the motor forward or reverse. The four-pole switches are employed for single or two-phase current and three-pole switches would be used with three-phase current.

A separate lighting circuit 49 is provided to be energized by the signal switches 14a and 15a for energizing the lights 16 and 17; the signal circuit may be energized by a battery 50 or may be connected in the motor circuit if desired.

The operation of the above described mechanism is briefly as follows:

With a plurality of press molds 2 mounted on the mold table 1 for receiving the mold charges 5 from the feeder 3 to subject them to the action of the plunger 4, the molds are successively charged with a gob 5 while the glass in the mold under plunger 4 is acted upon by the plunger to form a tumbler or other glass article. The switch triggers 21 and 30 are thrown out of function by moving them at an inclination to miss contact with the switch arms 14b and 15b, the pins 21a and 40 being inserted in the switch trigger supports for this purpose. The operator then adjusts the position of the refractory tube 7 of the feeder 3 to its proper height in relation to the feed orifice by manipulating the motor starter buttons 14 and 15 to operate the motor in the direction in which the adjustment of the member 7 is to be made. When, because of such adjustment, the gob or mold charge 5 is of the desired mass to produce the weight of glass tumbler desired, the pins 21a and 40 are removed from the triggers 21 and 30, which are allowed to assume a vertical position in cooperative alignment with switch arms 14b and 15b. If during the subsequent operation the weight of the mold charge decreases, it means that the mass of the gob 5 has for some reason been reduced as, for example, due to thermal conditions of the glass in the feeder boot 3. Plunger 4 in its forming operation will travel downward a greater distance in the mold 2 because of the lesser quantity of glass to be displaced therein, and such increased depth of travel of the plunger will cause the corresponding increase in the downward travel of trigger 21 which, when its notch 23 engages the switch arm 14b, will energize switch 14a, and the signal light 16 will be lighted to indicate to the operator that an adjustment of the feeder is necessary in a direction to increase the volume of the mold charge. The operator will then depress push-button switch 14 to energize the motor to raise the refractory tube 7, thereby permitting a larger mass of glass to flow through the feed orifice, whereby the weight of the mold charge is increased and the resultant formed article will again come up to specifications.

When the mold charge has been increased to again restore the normal travel of the forming plunger in the mold at which time the notch 23 of trigger 21 no longer engages switch arm 14b, the signal light 16 will be deenergized and the operator knows that normal operation has been restored.

If the mold charges 5 are in excess of the desired amount for the forming molds 2, the forming plunger 4 will not travel a sufficient distance for the cam surface 38 of trigger 30 to clear the cam surface 32 of the switch lever 15b, so that by engagement of these elements, cam 31, which is pivoted to switch arm 15b at 31a, will be actuated, causing a corresponding movement of the switch arm 15b which energizes the signal light 17. The operator will then depress push button switch 15, causing a reversal of the feeder motor 12, which lowers the refractory tube 7 relative to the feed orifice, thereby restricting the flow of molten glass from the orifice, resulting in gobs 5 of lesser mass. Again when normal flow of glass has been established, signal light 17 will be deenergized, indicating to the operator that further adjustment of the motor circuit by operation of push-button switch 15 is unnecessary.

It is of course apparent that the operator, by watching the signal lights 16 and 17, can in the first instance establish a normal flow by tapping the push-buttons 14 or 15 as required, and if during operation the glass characteristics change when, for example, the temperature of the glass changes, so that more or less glass is discharged for each impulse, the operator merely taps one of the push-buttons 14 or 15 as required, and thereby very fine adjustments of the rate of feeding are obtained. As heretofore explained, the motor 12 for the feeder is provided with a transmission 11 which is of a character to bring about very fine adjustments of the feeding tube when the motor is operated, and once the operator is familiar with the effect of the feeder adjustment through operation of the push-buttons 14 and 15, he can very readily bring about necessary changes in the mold charges.

As hereinbefore described, the automatic signalling of the light circuit is not effective for changes in mold height because the signal switches 14a and 15a on the spring-supported plate 18 Fig. 4, are movable with the spring plate 27 Fig. 1 that engages the mold. As will appear from an inspection of Figs. 1 and 4 of the drawings, the adjustable set screw 25 is set to engage the switch support 18 when the spring plate 27 is set to contact the highest mold of the group of molds on the mold table 1. If for different setting, the switch triggers 21 and 30 are set to clear the switches 14a and 15a, then any deviation from the required volume of glass fed to the mold will cause engagement of the switch triggers with their respective switches. If upon the indexing of the mold table a mold 2 of lesser height is brought in alignment with the plunger 4, the spring plate 27 will travel downward a greater distance before it contacts the top of the mold and the adjusting screw 25 will, therefore, depress the resiliently mounted switch support 18 a corresponding distance, so that there will be no change in the travel of the trigger operating mechanism which will remain ineffective; but when the quantity of glass fed to the mold varies, the corresponding change in travel of the plunger 4 will result in actuation of either switch arm 14b or 15b as the case may be to energize the lighting circuit.

It is, of course, evident that the motor 12 for regulating the feeder may be directly connected to be energized by switches 14a and 15a, but in the practical use of the device, it is found that manual control of the motor in response to automatic signalling of changes in the quantity of glass fed permits more accurate and speedy adjustment and prevents fluctuation of the motor back and forth if glass conditions are such as to cause great variations in flow, which would not be indicated until after the mold containing the charge has been brought in register with the forming plunger and the article has actually been formed.

Although one embodiment of the invention has been herein illustrated and described, it will be evident to those skilled in the art that various modifications may be made in the details of construction without departing from the principles herein set forth.

We claim:

1. In a ware-forming machine, a rotary table having plurality of angularly spaced receiving molds, a forming plunger for said molds, means for subjecting the plunger to reciprocatory movement to shape the contents of the molds in turn, and means operative with the plunger for indicating any excess or deficiency of the material acted upon by the plunger in any mold irrespective of the relative heights of said molds, said last named means comprising a spring plate mounted on the plunger adapted for engagement with the top of the mold, an arm mounted on said plate, a resiliently mounted platform, a switch supported thereby with means in line of travel of the spring plate arm for displacing said switch, and a second arm operative with the plunger movement for tripping said switch.

2. In a glass ware-forming machine, a rotatable mold table, a plurality of molds mounted in angularly spaced relation on said table, a vertically reciprocatory plunger with which the molds may be successively registered by rotation of said table, means for depositing mold charges in said molds, and means for indicating changes in the quantity of glass fed to the molds comprising a spring plate mounted for movement with the plunger and adapted for engagement with the top of the molds, an arm carried by the spring plate, a resiliently mounted platform in register with the spring plate arm to be displaceable thereby, a switch supported on said platform, and indicating means adapted to be energized by said switch, said means being operative with and in response to movement of said plunger and independently of any variations in the height of the several molds.

3. In a glass ware-forming machine having a rotatable mold table with a plurality of molds mounted in angularly spaced relation on said table, a vertically reciprocatory plunger with which the molds register in succession when the table is rotated, an electrical signalling circuit, a plurality of switches for energizing said circuit, said switches being mounted upon a plurality of spring supports, means actuated by the plunger movements for altering the position of said spring supports in accordance with variations in the height of the several molds, and means for actuating the arms of said switches, said last-named means being associated with and responsive to the plunger movements to energize the signalling circuit in accordance with variations in the quantity of the charges delivered to the several molds.

JOHN R. BEERS.
WILLIAM F. BEERS.